G. T. TRIBE & J. M. BEMIS.
AUTOMATIC HEADLIGHT.
APPLICATION FILED OCT. 28, 1909. RENEWED OCT. 26, 1911.
1,028,153.
Patented June 4, 1912.
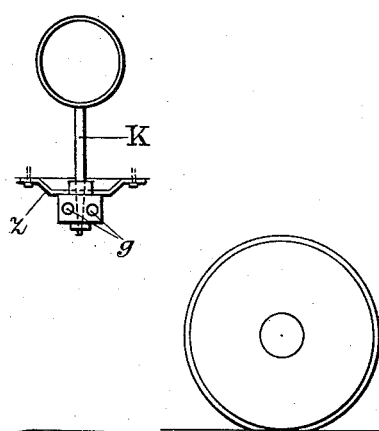
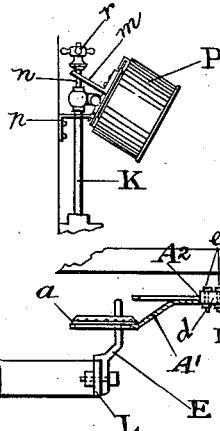
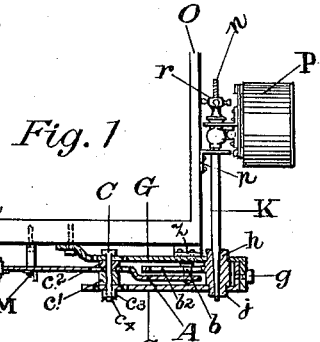
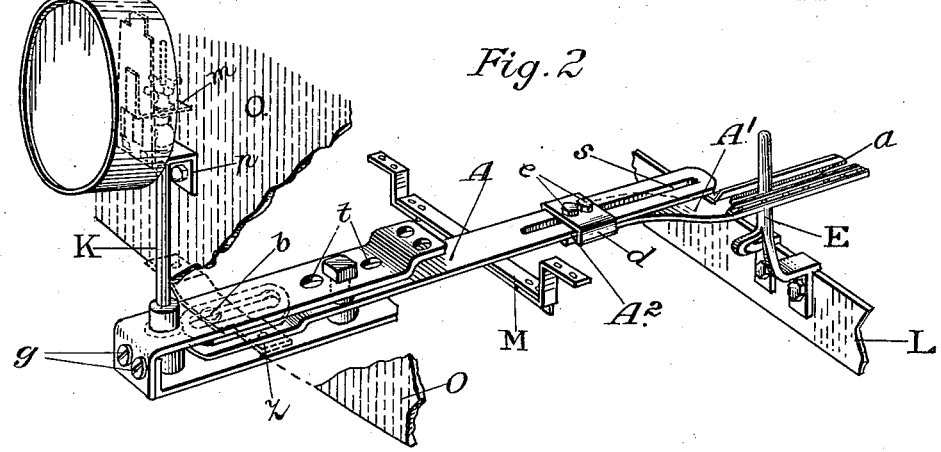
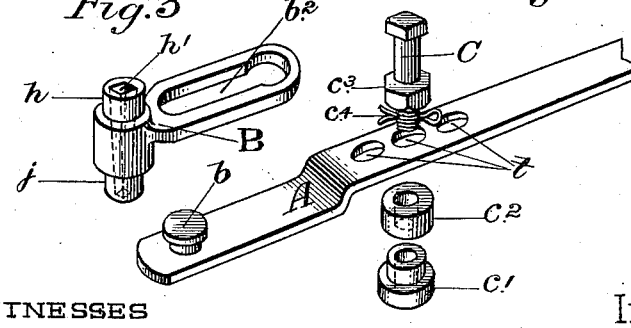
WITNESSES
A. William Svenson.
Edmund R. Cummins
INVENTORS
George T. Tribe
John M. Bemis

UNITED STATES PATENT OFFICE.

GEORGE T. TRIBE AND JOHN M. BEMIS, OF WORCESTER, MASSACHUSETTS.

AUTOMATIC HEADLIGHT.

1,028,153.     Specification of Letters Patent.     Patented June 4, 1912.

Application filed October 28, 1909, Serial No. 525,176. Renewed October 26, 1911. Serial No. 656,996.

*To all whom it may concern:*

Be it known that we, GEORGE T. TRIBE and JOHN M. BEMIS, both of the city of Worcester and State of Massachusetts, have invented a new and useful Improvement in Automatic Headlights; and we hereby declare that the following is a full, clear, and exact description of the same, reference being had to the accompanying drawings, forming part of this specification.

This invention has reference to an improvement in the ends of street cars, automobiles and other vehicles, and it consists in automatically turning a head-lamp, more fully set forth hereinafter.

The object of this invention is to turn a lamp automatically, keeping both rails within the ray of light while rounding curves in the track, and in regard to automobiles and other vehicles the turns in the road.

Figure 1 is a vertical section of the operating mechanism. Fig. 2 is an isometrical top view of the operating mechanism. Figs. 3 and 4 are views respectively, of the crank B, and the stud end of lever A, the pivotal bolt and washers. Fig. 5 is a front view of lamp and end view of frame of operating mechanism. Fig. 6 is a side view of lamp showing plate hinged to standard and the elevating and depressing screw.

In the drawings A A$^1$ indicate a cranked flat lever moving laterally and having a fork slot ($a$) at one end, and on the other end a circular shouldered stud ($b$) and at a point between $a$ and $b$ holes ($t$) to receive the washer ($c^1$) of the pivotal bolt C; the fulcrum pivotal bolt C, passes through holes ($t$) in upper and lower plates of frame G, having a shouldered washer ($c^1$), plain washer ($c^2$), nut ($c^3$) secured by linch pin ($c^4$); the lever plate is in two parts A and A$^1$ connected by expansion joint A$^2$ formed by slot (S) in the rearward end of lever A, bolt holes in forward end of (A$^1$) and channeled cover plate ($d$) with holes for clamping bolts ($c$); the prongs of the slotted end of A$^1$ are reinforced with angle iron secured to same.

The standard E, bolted to the center of the pivotal truck frame L, its upper end passing through the slot ($a$) of lever A$^1$ imparts a lateral motion either to right or left, subject to the car truck turning on its axis when rounding curves. The crank B, Fig. 3 has a slot ($b^2$) to receive shouldered stud ($b$) of lever A, and a vertical shouldered axle ($h$) ($j$) perforated throughout with a square tapered hole ($h^1$) and turns pivotally in holes in upper and lower plates G reciprocal to the movement of lever A, A$^1$. The lamp standard K turning freely in the staple ($p$) which is bolted to the front of the car, has a square tapered lower end to drop freely into the socket ($h^1$) in axle of crank B; the upper end of same being fitted with a hinged plate to hang the lamp on to which is screwed the slotted lever bar ($m$) straddling the vertical screw ($n$) with the hand nut ($p$) for raising and depressing the lamp P. The upper and lower plates of frame G containing the necessary perforations are secured to car by bolts or otherwise, and are connected in front as shown by the bolts ($g$). Plate ($z$) is attached to upper plate G, and at right angles to same having a projection each side to receive the bolts for securing operating mechanism to car; the bar M forms a support and slide for the rearward end of lever A, A$^1$.

Having thus described our invention we claim as new and desire to secure by Letters Patent:

The combination in a device for automatically turning the head light of a car having pivoted trucks; of a vertical lamp standard, rotatably supported in a bearing attached to the car, said standard having a square tapered end and a hinged plate at top to receive the said lamp, pivotally supported on said standard; a lever plate and screw for raising and depressing lamp; a crank with a shouldered portion having a square tapered vertical hole to receive the lower end of the lamp standard, and also having a laterally movable portion with a slot; with a laterally movable pivoted lever and its expansion joint, connecting the two parts and having a stud at its front end to engage the slot of said crank and a pronged slot at its rear end in which operates a vertical standard fastened to the front of a car truck, substantially as and for the purpose set forth.

In testimony whereof we have signed our names to this specification in the presence of two subscribing witnesses.

GEORGE T. TRIBE.
JOHN M. BEMIS.

Witnesses:
A. WILLIAM SVENSON,
EDMUND R. CUMMINS.

Copies of this patent may be obtained for five cents each, by addressing the "Commissioner of Patents, Washington, D. C."